United States Patent [19]

Myles

[11] 4,240,833

[45] Dec. 23, 1980

[54] SHRINK-RESISTANT REFRACTORY FIBER AND PROCESS FOR MAKING SAME

[75] Inventor: Thomas A. Myles, Tonawanda, N.Y.

[73] Assignee: The Carborundum Company, Niagara Falls, N.Y.

[21] Appl. No.: 102,606

[22] Filed: Dec. 12, 1979

Related U.S. Application Data

[63] Continuation of Ser. No. 928,201, Jul. 26, 1978, abandoned.

[51] Int. Cl.$^3$ .......................... C03C 3/22; C04B 35/14; C04B 35/44; C03C 13/00
[52] U.S. Cl. ..................................... 106/39.6; 106/50; 106/65; 106/69
[58] Field of Search ..................... 106/39.6, 50, 65, 69

[56] References Cited

U.S. PATENT DOCUMENTS 3,503,765  3/1970  Blaze, Jr. ................................ 106/65

FOREIGN PATENT DOCUMENTS 1481133  7/1977  United Kingdom .................... 106/39.6

*Primary Examiner*—O. R. Vertiz
*Assistant Examiner*—Mark Bell
*Attorney, Agent, or Firm*—David E. Dougherty; Raymond W. Green; Michael L. Dunn

[57] ABSTRACT

A shrink resistant flexible ceramic fiber and its process of manufacture which comprises melting from about 40 to 65 weight percent of alumina with from about 35 to about 60 weight percent of silica, forming fibers from the melt, rapidly solidifying the fibers, heating the fibers to a sufficient temperature for a sufficient time to form microcrystals and cooling the fibers to below the crystallization temperature before macrocrystals can form.

11 Claims, No Drawings

SHRINK-RESISTANT REFRACTORY FIBER AND PROCESS FOR MAKING SAME

This is a continuation of copending application Ser. No. 928,201, filed July 26, 1978 now abandoned.

BACKGROUND OF THE INVENTION

(A) Field of the Invention

This invention concerns ceramic fibers and more particularly concerns refractory fibers commonly used for insulating high temperature furnaces.

(B) History of the Prior Art

In the prior art, refractory fibers containing alumina were used as insulation in high temperature applications especially in high temperature furnaces. Such prior art fibers which were flexible enough to be easily applied to a furnace wall had a serious disadvantage since after being applied to a furnace wall, they tended to shrink at temperatures as low as about 1000° C. and would seriously shrink, e.g., as much as 5%, at temperatures of about 1250° C. Shrinkage of such prior art fibers or mats and blankets made from such fibers became totally unacceptable at temperatures in excess of 1250° C.

Fibers or mats and blankets made from refractory fibers which did not shrink at unacceptable levels at temperatures in excess of 1250° C. were too brittle to permit such fibers, mats or blankets to be easily installed as insulation within a furnace.

Examples of materials which have insufficient flexibility for ease of installation are disclosed in U.S. Pat. No. 3,935,060 to Blome et al, U.S. Pat. No. 3,865,599 and U.S. Pat. No. 3,982,955 to Mansmann et al.

An example of a refractory fibrous material which has sufficient flexibility to be installed into a high temperature furnace is disclosed in British Pat. No. 1,481,133 assigned to The Babcock and Wilcox Co. and published July 27, 1977 subsequent to the making of the invention disclosed herein. This material does not, however, have sufficient shrink resistance to make it desirable for use at temperatures above 1250° C.

In areas unrelated to fibers, other prior art information is available concerning solid refractory substances which are pre-heated prior to use. Among such prior art are U.S. Pat. Nos. 1,807,915; 2,102,976; 2,524,601; 3,754,950; 3,826,813; 3,857,923; 3,880,971 and 3,903,225.

BRIEF DESCRIPTION OF THE INVENTION

In accordance with the invention, there is provided a shrink resistant flexible ceramic fiber comprising a microcrystalline combination of alumina and silica, which is believed to be microcrystalline mullite, manufactured by forming amorphous fibers from a melt comprising from about 40 to about 65 weight percent alumina and from about 35 to about 60 weight percent silica. After the fibers are formed, they are heated to a sufficient temperature for a sufficient time to form microcrystals. The fibers are then cooled to below the crystallization temperature before macrocrystals can form. The melt from which the original amorphous fibers are formed is essentially free from alkali and alkaline earth metal oxides. The melt is also desirably essentially free from the oxides of boron, lead, copper and zinc. The invention further comprises the process for manufacturing the shrink resistant flexible ceramic fiber by melting from about 40 to about 65 weight percent alumina with from about 35 to about 60 weight percent silica and forming fibers from the melt followed by rapid solidification to form amorphous fibers. The amorphous fibers are then heated to a sufficient temperature for a sufficient time to form microcrystals. After the microcrystals are formed, the fibers are cooled below the crystallization temperature before macrocrystals can form.

DETAILED DESCRIPTION OF THE INVENTION

The shrink resistant flexible ceramic fiber in accordance with the invention comprises a microcrystalline combination of alumina and silica believed to be microcrystalline mullite. "Microcrystalline" as used herein means a crystalline structure having numerous crystals, i.e., microcrystals, with an average size of less than about 5 percent of the fiber diameter and desirably less than 0.1 microns.

"Macrocrystals" are crystals larger than microcrystals.

"Mullite" as used herein is intended to mean an alumina-silica crystal structure believed to have the formula $3Al_2O_3.2SiO_2$.

"Flexible" as used herein means that the ceramic fiber when formed into a mat having the density of from about 0.05 to about 0.2 grams per cc can be bent in an arc having a radius of about 1.5 centimeters at a mat thickness of about 2.54 centimeters without significant breaking of the fibers.

"Shrink resistant" as used herein means that the mat of fibers having a density of from about 0.06 to about 0.2 grams per cc and an average fiber diameter of from about 1 to about 5 microns and a thickness of about 2.54 centimeters can be exposed to a temperature of about 1425° C. for 24 hours with a linear shrinkage of less than 2 percent.

The shrink resistant flexible ceramic fiber, which comprises microcrystalline mullite, is manufactured by forming amorphous fibers from a melt containing from about 40 to about 65 weight percent alumina and from about 35 to about 60 weight percent silica.

"Amorphous" is intended to mean without a true crystalline structure.

The melt of alumina and silica is prepared by heating a mixture of alumina and silica to a temperature above the melting point of alumina for a sufficient time to form an essentially uniform liquid. Fibers are then formed from the liquid by spinning, extrusion, blowing or combination thereof. In general the preferred methods for forming fibers are blowing or spinning according to methods known to those skilled in the art. The preferred range of fiber diameter is between about 0.5 and about 25 microns and, for better thermal resistivity, from about 1 to about 5 microns.

Alumina used in the melt is desirably essentially pure and may be Bayer process alumina. Similarly, the silica used should be essentially pure.

"Essentially pure" as used herein means that the alumina or silica contains less than 5 weight percent and preferably less than 3 weight percent impurities. Desirably, the alumina and silica should be essentially free from alkali and alkaline earth oxides and should be essentially free from the oxides of boron, lead, copper and zinc.

"Essentially free" means that insufficient impurity is present to interfere with the formation of microcrystalline mullite in the fiber structure so as to prevent fiber from being either flexible or shrink resistant. Generally, less than 0.5 weight percent and preferably less than 0.1 weight percent of combined alkali and alkaline earth oxides and oxides of boron, lead, copper and zinc can be tolerated and less than 0.5 weight percent and preferably less than 0.1 weight percent of any one oxide of alkali and alkaline earth metals, boron, lead, copper and zinc should be present. Larger amounts, e.g., 3 and perhaps up to 5 percent of zirconium dioxide, vanadium pentoxide and phosphorous pentoxide can be tolerated and small amounts, e.g., less than about 2 percent of titanium dioxide and less than about 2 percent of ferric oxide can be present.

After the fiber is formed, it is cooled sufficiently rapidly, e.g., by air or liquid quenching to cause the fiber to become amorphous rather than crystalline in nature. Subsequent to cooling, the fiber is heated to a sufficient temperature for a sufficient time to form microcrystals which are believed to be microcrystals of mullite. Subsequent to heating to the sufficient temperature for the sufficient time, the fibers are cooled to below the crystallization temperature before macrocrystals can form.

"Sufficient temperature" as used herein means the temperature at which the amorphous character of the fibers will convert to a microcrystalline character within a predetermined sufficient time. The sufficient time is the total time required above the crystallization temperature to form microcrystals including the time required to reach the sufficient temperature, the time at the sufficient temperature and the time required to return to below the crystallization temperature. The sufficient time is insufficient to form macrocrystals.

"Crystallization temperature" is the minimum temperature at which crystals will form within the fiber and is believed to be 960° C.

The sufficient temperature is a temperature in excess of 960° C. From 960° C. to about 1050° C., the conversion rate to form a microcrystalline fiber, while operative, is too slow for most commercial applications since generally from 2 hrs. to several days is required for the conversion from amorphous to microcrystalline form. The preferred sufficient temperature is therefore between 1050° C. and 1240° C. At temperatures above 1240° C., the crystal structures become rapidly too large thus making the fiber brittle. When the sufficient temperature is from 1050° C. to about 1150° C., the sufficient time for the conversion is between about 15 and 180 minutes and when the sufficient temperature is from about 1150° C. to about 1240° C., the sufficient time is between 0 and about 30 minutes. Sufficient time and sufficient temperature are inversely interdependent thus the higher the sufficient temperature, the shorter the sufficient time which is required to form microcrystals. Times should not be used which are sufficiently long to cause macrocrystal formation in the fiber which cause embrittlement; therefore, after the fiber is held at the sufficient temperature for a sufficient time to cause microcrystal growth, the fiber is cooled below 960° C. before macrocrystals can form.

In general, when the sufficient temperature is above 1200° C., the sufficient temperature should be reached from 960° C. within from 0 to about 2 minutes and similarly, the fiber should be cooled from the sufficient temperature to below 960° C. within from 0 to 2 minutes.

The fiber, when heated to the sufficient temperature, may be an independent fiber or may form a part of a fiber containing structure such as a fiber blanket or mat. Such blankets or mats of refractory fibers are usually used for insulating high temperature apparatus such as high temperature furnaces. A fiber mat or blanket having a density of about 0.05 to about 0.2 grams per cc and a thickness of about 1 to about 10 centimeters manufactured from fibers in accordance with the present invention, can be used at temperatures as high as 1425° C. with less than 2 percent linear shrinkage yet are sufficiently flexible to be applied to furnace walls without an unacceptable amount of cracking or breaking of the fibers or mats.

The following examples serve to illustrate and not limit the process and fiber of the invention. Unless otherwise indicated, all parts and percentages are by weight.

EXAMPLE 1

A mixture of 50 percent Bayer process alumina and 50 percent high purity silica sand is melted in an open arc furnace. Fibers are then blown from the liquid having an average diameter of about 3 microns. A fiber mat is then formed from the fibers having a thickness of 2.54 centimeters, a length of 25.4 centimeters and a width of about 12.7 centimeters. The mat has a density of 0.1 grams per cc. The mat is then placed in a furnace at about 1,425° C. for 24 hours. After 24 hours, the mat is found to have a linear shrinkage of 6.37 percent.

EXAMPLE 2

Example 1 is repeated except that the blanket, prior to incorporation into the furnace at 1425° C., is pretreated at 1095° C. for five minutes. The product is found to retain its flexibility prior to incorporation into the furnace at 1425° C. for 24 hours. After furnacing, the linear shrinkage is found to be 4.14 percent.

EXAMPLE 3

Example 2 is repeated except that the blanket is pretreated for 15 minutes at 1095° C. The product is again found to retain its flexibility prior to furnacing and subsequent to furnacing is found to have a linear shrinkage of 0.92 percent.

EXAMPLE 4

Example 2 is repeated except that the blanket is pretreated at 1095° C. for 30 minutes. The blanket is again found to retain its flexibility prior to furnacing at 1425° C. and subsequent to furnacing, is found to have a linear shrinkage of 1.25 percent.

EXAMPLE 5

Example 2 is repeated except that the blanket is pretreated at 1200° C. for two minutes. Prior to furnacing at 1425° C., the blanket is found to be flexible and subsequent to furnacing, is found to have a linear shrinkage of 1.58 percent.

EXAMPLE 6

Example 5 is repeated except that the pre-treating time is three minutes. Prior to furnacing at 1425° C., the blanket is found to be flexible and subsequent to furnacing, is found to have a linear shrinkage of 1.7 percent.

EXAMPLE 7

Example 5 is repeated except that pre-treating time is four minutes. Again, the pre-treated blanket is found to be flexible prior to furnacing at 1425° C. and subsequent to furnacing, is found to have a linear shrinkage of 1.66 percent.

EXAMPLE 8

Example 5 is repeated except that the pre-treating time is five minutes. Again, the blanket is found to be flexible prior to furnacing at 1425° C. and subsequent to furnacing, is found to have a linear shrinkage of 0.81 percent.

EXAMPLE 9

Example 5 is repeated except that the pre-treating time is fifteen minutes. Prior to furnacing at 1425° C., the blanket or mat is found to be flexible and subsequent to furnacing at 1425° C., is found to have a linear shrinkage of only 0.33 percent.

EXAMPLE 10

Example 1 is repeated except that the melt contains 60 percent Bayer process alumina and 40 percent high purity silica sand. The fiber mat is found to have a linear shrinkage of 5.95 percent after furnacing for 24 hours at 1425° C.

EXAMPLE 11

Example 10 is repeated except that prior to furnacing at 1425°, the fiber blanket or mat is pre-treated at 1095° C. for five minutes. Prior to furnacing at 1425° C., the mat is found to be flexible and subsequent to furnacing for 24 hours at 1425° C., the linear shrinkage is found to be 3.99 percent.

EXAMPLE 12

Example 11 is repeated except that the pre-treating time is fifteen minutes. Prior to furnacing at 1425° C., the mat is found to be flexible and subsequent to furnacing, is found to have a linear shrinkage of 1.01 percent.

EXAMPLE 13

Example 11 is repeated except that the pre-treating time is thirty minutes. Prior to furnacing at 1425° C., the blanket is found to be flexible and subsequent to furnacing, is found to have a linear shrinkage of 1.21 percent.

EXAMPLE 14

Example 11 is repeated except that the pre-treating temperature is 1200° C. and the pre-treating time is five minutes. Prior to furnacing at 1425° C., the blanket is found to be flexible and subsequent to furnacing, is found to have a linear shrinkage of 1.03 percent.

EXAMPLE 15

Example 14 is repeated except that the pre-treating time is fifteen minutes. Prior to furnacing at 1425° C., the blanket is found to be flexible and subsequent to furnacing, the linear shrinkage is found to be 0.98 percent.

EXAMPLE 16

Example 1 is repeated except that kaolin clay containing about 4 percent iron oxide plus titania and containing about 0.5 weight percent sodium oxide is substituted as the raw material for the Bayer process alumina and silica. After furnacing at 1425° C. for 24 hours, the linear shrinkage is found to be 12.2 percent.

EXAMPLE 17

Example 16 is repeated except that the fibers are heated to about 982° C. (1800° F.) for thirty minutes, which as disclosed herein, is an insufficient heating time at such a low temperature. After furnacing at 1425° C. for 24 hours, the linear shrinkage is found to be 12.58 percent.

The foregoing examples clearly illustrate the effectiveness of the process of the invention in forming a fiber and fiber blanket which retains sufficient flexibility to permit it to be incorporated as insulation into a furnace and which when heated to a temperature as high as 1425° C., shows dramatically less shrinkage than a similar fiber or fiber mat which is not treated in accordance with the process of the invention.

What is claimed is:

1. A shrink resistant flexible ceramic fiber comprising a microcrystalline combination of alumina and silica manufactured by forming amorphous fibers from a melt containing from about 40 to about 65 weight percent alumina and from about 35 to about 60 weight percent silica followed by heating the fibers to a sufficient temperature for a sufficient time to form microcrystals and cooling the fibers below the crystallization temperature before macrocrystals form, said melt being essentially free from alkali and alkaline earth metal oxides and oxides of boron, lead, copper and zinc; the ceramic fiber being capable of being exposed to a temperature of 1425° C. for 24 hours with a linear shrinkage of less than 2 percent.

2. The shrink resistant flexible ceramic fiber of claim 1 manufactured by forming amorphous fibers from a melt consisting essentially of from about 40 to about 65 weight percent alumina and from about 35 to about 60 weight percent silica followed by heating the fibers to a sufficient temperature of from 1150° C. to 1240° C. and maintaining said temperature for a sufficient time of between 0 and 30 minutes to convert the amorphous fibers to microcrystalline fibers of sufficient crystallinity such that a mat formed from said fiber has a linear shrinkage of less than two percent after 24 hours at 1425° C. followed by cooling the fibers below the crystallization temperature before macrocrystals form.

3. The shrink resistant flexible ceramic fiber of claim 2 wherein said sufficient temperature is from 1200° to about 1240° C. and said fiber is heated from below 960° C. to said sufficient temperature in from 0 to about 2 minutes; and cooled to below the crystallization temperature within from 0 to 2 minutes.

4. The shrink resistant flexible ceramic fiber of claim 2 wherein said sufficient temperature is about 1200° C. and said sufficient time is between about 2 and about 15 minutes.

5. The shrink resistant flexible ceramic fiber of claim 1 wherein said sufficient temperature is about 1095° C. and said sufficient time is between about 15 and about 30 minutes.

6. The shrink resistant flexible ceramic fiber of claim 2 wherein said fiber is in a fiber mat prior to heating.

7. A process for the manufacture of a shrink resistant flexible ceramic fiber which comprises:
   (a) melting from about 40 to about 65 weight percent of alumina with from about 35 to about 60 weight percent of silica;
   (b) forming fibers from the melt;
   (c) rapidly solidifying said fibers to form amorphous fibers;
   (d) heating the fibers to a sufficient temperature of from 1150° C. to 1240° C.;
   (e) maintaining said temperature for a sufficient time of between 0 and 30 minutes to convert the amorphous fibers to microcrystalline fibers of sufficient crystallinity such that a mat formed from said fiber has a linear shrinkage of less than two percent after 24 hours at 1425° C.; and (f) cooling the fibers to below the crystallization temperature before macrocrystals can form.

8. The process of claim 7 wherein said sufficient temperature is between 1200° C. and 1240° C.; said fiber is heated from below 960° C. to said sufficient temperature in from 0 to about 2 minutes; and said fibers are cooled to below the crystallization temperature within from 0 to 2 minutes.

9. The process of claim 7 wherein said fibers are formed by spinning, extrusion or blowing.

10. The process of claim 7 wherein said sufficient temperature is about 1200° C. and said sufficient time is between about 2 and about 15 minutes.

11. A process for the manufacture of a shrink resistant flexible ceramic fiber according to claim 1, which comprises:
(a) melting from about 40 to about 65 weight percent of alumina with from about 35 to about 60 weight percent of silica;
(b) forming fibers from the melt;
(c) rapidly solidifying said fibers to form amorphous fibers;
(d) heating the fibers to a sufficient temperature of about 1095° C.;
(e) maintaining said temperature for a sufficient time of between about 15 and about 30 minutes to convert the amorphous fibers to microcrystalline fibers of sufficient crystallinity such that a mat formed from said fiber has a linear shrinkage of less than 2 percent after 24 hours at 1425° C.; and
(f) cooling the fibers to below the crystallization temperature before macrocrystals can form.

* * * * *